United States Patent [19]
Lockwood

[11] Patent Number: 5,309,355
[45] Date of Patent: May 3, 1994

[54] AUTOMATED SALES SYSTEM

[76] Inventor: Lawrence B. Lockwood, 5935 Folsom Dr., La Jolla, Calif. 92037

[21] Appl. No.: 116,654

[22] Filed: Sep. 3, 1993

Related U.S. Application Data

[63] Continuation of Ser. No. 396,283, Aug. 21, 1989, abandoned, which is a continuation-in-part of Ser. No. 152,973, Feb. 8, 1988, abandoned, which is a continuation-in-part of Ser. No. 822,115, Jan. 24, 1986, abandoned, which is a continuation-in-part of Ser. No. 613,525, May 24, 1984, Pat. No. 4,567,359.

[51] Int. Cl.⁵ .............................................. G06F 15/20
[52] U.S. Cl. ................................... 364/401; 364/407; 235/381
[58] Field of Search ................. 364/401, 407, 408; 358/86; 235/380, 379, 375, 381

[56] References Cited

U.S. PATENT DOCUMENTS

| Re. 30,773 | 10/1981 | Glaser et al. | 235/379 |
|---|---|---|---|
| Re. 32,115 | 4/1986 | Lockwood | 235/381 |
| 3,445,633 | 5/1969 | Ratner | 235/61.7 |
| 3,718,906 | 2/1973 | Lightner | 340/147 |
| 4,186,438 | 1/1980 | Benson | 364/200 |
| 4,193,114 | 3/1980 | Benini | 364/200 |
| 4,355,372 | 10/1982 | Johnson et al. | 364/900 |
| 4,360,345 | 11/1982 | Hon | 434/262 |
| 4,414,467 | 11/1983 | Gould et al. | 235/381 |
| 4,438,326 | 3/1984 | Uchida | 235/379 |
| 4,449,186 | 5/1984 | Kelly et al. | 364/407 |

FOREIGN PATENT DOCUMENTS

| 1189973 | 7/1985 | Canada | 354/34 |
|---|---|---|---|
| 1236216 | 5/1988 | Canada | 354/34 |
| 0109189 | 5/1984 | European Pat. Off. | G06F 15/24 |
| 48-11893 | 2/1973 | Japan | |
| 48-43699 | 6/1973 | Japan | |
| 49-73198 | 7/1974 | Japan | |
| 50-98626 | 8/1975 | Japan | G06F 15/40 |
| 50-133892 | 10/1975 | Japan | G07F 9/00 |
| 52-272800 | 5/1977 | Japan | G07B 1/00 |
| 52-113655 | 9/1977 | Japan | G06F 15/26 |
| 53-24238 | 3/1978 | Japan | G06F 3/00 |
| 53-57100 | 5/1978 | Japan | G07F 17/30 |
| 54-40700 | 3/1979 | Japan | G07B 1/00 |
| 54-60000 | 5/1979 | Japan | G07B 1/00 |
| 54-114153 | 9/1979 | Japan | G06F 15/26 |
| 57-92254 | 6/1982 | Japan | G07B 1/00 |
| 57-152031 | 9/1982 | Japan | G06F 3/02 |
| 57-201955 | 12/1982 | Japan | G06F 15/26 |
| 61-234484 | 10/1986 | Japan | G07B 1/00 |
| 1437883 | 6/1976 | United Kingdom | B41J 5/48 |
| 1504112 | 3/1978 | United Kingdom | G11C 9/06 |
| 1504113 | 3/1978 | United Kingdom | B41J 5/48 |

OTHER PUBLICATIONS

Auerbach on Data Collection Systems, ISBN: 0-877-69-106-1 Published 1972. Pp. 15-40, 71-74, 84-92 and 118-122.
MCA Discovision brochure. Circa 1979.
Travel-Vision brochure, circa 1978.

(List continued on next page.)

Primary Examiner—Roy N. Envall, Jr.
Assistant Examiner—Andrew Bodendorf
Attorney, Agent, or Firm—Henri J. A. Charmasson

[57] ABSTRACT

An apparatus for composing individualized sales presentations created by various data sources from customer profiles managed by organizational hierarchy matrixes directed by multiple operating programs. The apparatus provides the means for synergistically creating and displaying customized presentations in a convenient manner for both the client and salesperson to achieve a more accurate, efficient and comprehensive marketing presentation. Organizational hierarchies of data sources are arranged so that an infinite number of sales presentation configurations can be created. Multiple microprograms automatically compose the sales presentations initiated by determinants received from client profiles stored on optical memory or smart cards, sales agent assessment of client profiles or centralized sales systems responsive to client profiles.

5 Claims, 6 Drawing Sheets

OTHER PUBLICATIONS

Fishing Resorts of the World, 1978; Ex. Ed. Syd Love.
*Fortune*, Apr. 1964: "On Line In Real Time" by Gilbert Burck, pp. 141-143.
*Systems*, Jun. 1967: "Sabre—Electronic Airline Reservation System" pp. 23-25.
*Aviation Week & Space Technology*, Dec. 23, 1968: "Airline Data Systems Seen Cutting Costs" by Nielson S. Himmel, pp. 70-73.
*Aviation Daily*, Oct. 30, 1969: "American, IBM, American Express To Test Automatic Ticket Vendor."
*Aviation Week & Space Technology*, Nov. 3, 1969: "American Plans Self-Service Ticketer Test" by Benjamin M. Elson.
"What is Sabre?" circa 1970: Press Release, pp. 1-8.
"American Airlines Electronic Reservations Processing System" circa 1970: Brochure, pp. 1&2.
*IBM—Airlines Control Program*, Second Edition: Mar. 1974, pp. 1-41.
*Aviation Week & Space Technology*, Nov. 18, 1974: "Airlines, Agents Study Reservations Net" by Kenneth J. Stein, pp. 27&28.
*IBM—Technology Disclosure Bulletin*, vol. 17, No. 9, Feb. 1975: "Trip Ticket" by M. G. Hurley and H. H. Stair, pp. 2768-2770.
*American Airlines Tulsa Computer Center*, "370 Series Processor": Nov. 1975 thru Jun. 1976, pp. 1-11.
*Clifton N.J. News Journal*, "Greenwald Travel Introduces Computerized Reservation System" Aug. 3, 1977.
*The Bridge Port Post*, "D'Elia Agency Provides Automated Reservations" Aug. 7, 1977.
"Best Of The Bunch" Nov.-Dec. 1977 by Edward F. Pierce, pp.27-30. Magazine title not available.
*Wyckoff N.J. News*, Nov. 10, 1977, "New Computer Revolutionizes Travel Plans."
*Online Review*, vol. 3, No. 2, 1979: "Viewdata" p. 140.
*Vending Times*, Nov. 1979: Wurlitzer Card Control, p. 75.
"The American Airlines Sabre System: A Profile" Jan. 1983, pp. 1-11.
*Travel Weekly*, Apr. 21, 1983: "Automated Insurance Sales Experiment Proves Successful".
*Vending Times*, Jan. 1984: "ByVideo Tests Interactive Retailing System" p. 52.
*Aviation Week & Space Technology*, Nov. 2, 1984: "Automatic Ticket Machine Use May Change Sales Strategies" pp. 179-182.

ized airline reservation systems. Travel agents are able to synergistically compose individual customized sales presentations and itineraries for their clients, representing thousands of tour destinations and criteria, from multiple permutations of data sources in a fully automated fashion.

AUTOMATED SALES SYSTEM

REFERENCE TO RELATED APPLICATIONS

This application is a continuation of Ser. No. 07/396,283 filed Aug. 21, 1989 now abandoned, which is a continuation-in-part of Ser. No. 07/152,973 filed Feb. 8, 1988 now abandoned, which is a continuation-in-part of Ser. No. 822,115 filed Jan. 24, 1986 now abandoned, which is a continuation-in-part of Ser. No. 613,525 filed May 24, 1984, now U.S. Pat. No. 4,567,359 issued Jan. 28, 1986.

BACKGROUND OF THE INVENTION

1. Field of the Invention

This invention is directed to an automated sales system. Specifically this invention is directed to a tool for augmentation of sales and marketing capabilities of travel agency personnel in conjunction with computerized airline reservation systems. Travel agents are able to synergistically compose individual customized sales presentations and itineraries for their clients, representing thousands of tour destinations and criteria, from multiple permutations of data sources in a fully automated fashion.

2. Description of the Prior Art

During the 1980s airline reservation systems evolved into very sophisticated information networks. A majority of travel agencies in North America subscribe to one of the major computerized reservations systems; Sabre, Apollo, System One, Datas II or PARS. Prior to the development of computerized reservations systems in the 1970s, a travel agent would read airline schedules from either the North American or International edition of official Airline Guides (OAG), printed directories which are published monthly, then telephone the specific airline to reserve and confirm passenger flights and physically write the airline tickets. The advent of computerized reservations systems allowed the travel agent to access computerized travel data banks, reserve, confirm and transact airline, hotel or car rental reservations with a workstation comprised of; keyboard for entry of customer requirements in conjunction with a display terminal and ticket printer, connected to the centralized reservation service. The Mar. 19, 1985 testimony of Robert L. Crandall, President of American Airlines, Inc., before the Aviation Subcommittee of the Senate Committee on Commerce, Science and Transportation details the evolution of computerized reservations systems in the United States.

Travel agency employees, who produce approximately seventy-five percent of the computerized reservations systems volume, now enjoy a more productive and accurate means to process reservations, an important part of their service functions. A simultaneous sector of a travel agent's employment is the ability to promote, advise, select and sell appropriate travel and tour destinations for their clients. Agencies generate approximately fifty percent of car rental bookings, seventy percent of domestic air travel sales and ninety percent of international flights.

Travel agents sell nearly ninety percent of all cruise line bookings and virtually ninety percent of all tour packages. This business represents the most profitable segment of the multibillion dollar travel agency sales volume, since higher commissions are earned on tour/cruise bookings as compared with point-to-point airline ticketing. The ability of a travel agent to effectively consult with their clients depends upon several factors including; knowledge of the destination, familiarization tours the agent may have taken to the area, attendance at travel/tour seminars and conferences and reading reference literature such as Fordor's travel publications.

A travel professional accumulates extensive knowledge which is extremely valuable to the travel agency business and is in fact the single most important element which differentiates one agent from another. Unfortunately this knowledge requires years of experience to acquire. The physical requirements to visit and inspect even a portion of popular tourist destinations dictates a significant investment of time and monetary expense. Additionally, tourist localities are seldom static; new hotels or attractions and changing custom regulations require a constant monitoring of hundreds of potential vacation sites.

The current state-of-the-art of the tour, cruise and vacation segment is similar in many respects to the precomputerized reservations systems airline era. A travel agent must consult several directories; i.e. Hotel and Travel Index, OAG Travel Planner, OAG Worldwide Tour Guide or OAG Worldwide Cruise and Shipline Guides and scores of travel brochures in an attempt to offer the client information for an informed travel decision. Most of these directories are published quarterly so therefore prices or schedules are frequently out-of-date and inaccurate. If the client is conferring in person, with the agent in the office, this task is complicated by the reliance on numerous publications to describe a particular vacation. This often results in a time-consuming, disorganized and ineffective sales presentation since each client's itinerary has different requirements. Answering a client's questions is dependent upon the knowledge a travel agent has acquired. Since 'travel' is an intangible product, the communicative skills of the travel agent are paramount to success. The client relies on the travel agent's advice in making important vacation decisions.

Several specialized tour planning concepts emerged in the 1970s including publications such as Fishing Resorts of The World, which presented sportfishing tour packages in an organized and informative manner and audio-visual presentations of tour destinations such as TRAVEL-VISION which were linear in design. These travel marketing concepts, both created by applicant, had inherent limitations as discussed herein.

The travel industry, comprising 33,000 agencies, does not sell a single mass market product, but rather is a reflection of the population as a whole with its infinite individual customer profiles of demographic, regional and fields of special interest. One client may desire information on a river-rafting tour in Wyoming while the next customer needs assistance in planning an art tour of Paris, France. Therefore, it is imperative that the travel agent have available a wide variety of information in an organized system which allows convenient and standardized access for both the agent and client.

A recent study of the American labor force, Work Force 2000: Work and Workers for the Twenty-first Century, commissioned by the United States Department of Labor, indicates serious shortages of skilled workers in the service sector economy will impact the United States during the 1990s and into the next century. In addition to labor shortages in many skilled service sector industries, it is predicted that a mismatch of employee skills to available jobs will result in a shrinking labor pool of skilled workers which will inevitably increase wages. Travel agency functions are predominantly labor intensive, therefore labor shortages of skilled workers will significantly impact the quality of service they provide.

All travel agencies essentially market the same products and represent the same suppliers, therefore as a service sector industry it is incumbent that individual sales skills and support systems be as comprehensive and efficient as possible. Since the travel industry is highly dependent upon knowledgeable professionals, requiring years of experience, it portends that a more efficient travel/tour sales and training system be implemented to compensate and increase the productivity of the travel agent.

Thus, there is a continuing need to provide the means to assist travel agency personnel and their clients with a more responsive and efficient; educational, training, sales and service system.

SUMMARY OF THE INVENT

Accordingly the objects of this invention, among others are to:

enhance the travel agent's sales ability and professional knowledge of travel and tour destinations in conjunction with computerized reservation systems;

create a flexible travel sales system responsive to multiple applications and configurations;

organize a variety of traditional travel and tour references in a comprehensive and synergistic multi@media sales system to effectuate consumer awareness;

increase the sales productivity and information accuracy of vacation tour packages sold by travel agents;

develop individualized tour planning programs for clients presented in a more effective communication's medium;

reduce travel agent dependency on outdated travel directories, tour manuals and traditional brochures;

provide a consistent in-house teaching and training system for travel agency personnel; and offer travel suppliers and tour operators an enhanced and efficient means to present their products and to communicate with potential customers when selecting vacation destinations.

These and other objects are achieved by the preferred embodiment of the invention which is directed to a means for automatically creating and displaying customized travel and tour sales presentations from various data sources managed by a multiplicity of operating programs. Sales presentations comprise audio-visual data sources and computerized reservation system information, presented individually or in combination.

Individualized sales presentations are requested by the client for specific destinations. The organizational hierarchy of data sources is arranged so that a infinite number of sales presentation configurations can be displayed. Multiple operating programs create the sales presentations directed by:

(1) Client profiles stored on optical memory or smart cards;

(2) Travel agent assessment of client profiles; or (3) Computerized reservation system response to client profiles.

The travel agent interviews the client and determines the general information required for accessing the sales system and enters the prerequisites such as; destination, tour costs, sports activities, accommodations and other factors necessary for generation of customized mini-travelogues. The selected factors are analyzed by the operating program based upon an organizational hierarchy of travel specifications which activates the data sources and a customized sequence is presented. Sales presentations can be accessed interactively, one display frame at a time with a decision point at each juncture, or by analysis of the client's profile which generates a coded operating program sequence to display a continuous customized presentation. Additionally, a combination of either interactive or coded program modalities can be presented. A client may wish to preview a destination in an interactive sequence and upon deciding that the tourist destination is in fact the one he desires, could proceed with an operating program from the input of client characteristics. This alternating procedure allows greater comprehension and sales flexibility.

Operating programs select the presentation chapter segments from either the audio-visual data source repository or the computerized reservation system and arrange them in an orderly and predetermined sequence. The sales presentations incorporate proven 'need satisfaction selling' including: probing, supporting and closing techniques. This assures a maximum sales effort on behalf of the travel industry. Clients are both creators and viewers of the mini-travelogues which are specifically addressing their needs while simultaneously assisting the travel agent in a comprehensive sales effort.

DESCRIPTION OF THE PREFERRED EMBODIMENT

Figure 1:
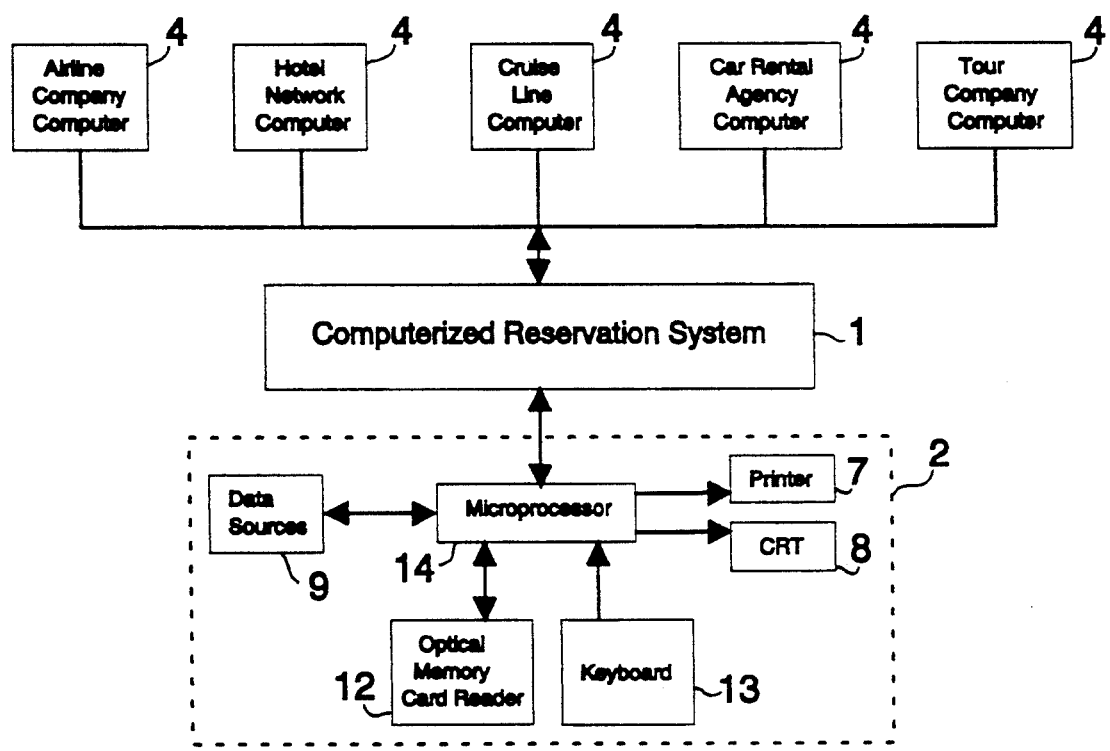
FIG. 1 represents a general block diagram of the overall system for creating customized travel sales presentations.

FIG. 1 represents a general block diagram of the overall system for creating customized travel sales presentations according to the preferred embodiment of the invention. It will be understood that such a system may be used in a variety of other service-oriented industries, such as the retail sales and real estate industry, various financial services and the like.

The system basically comprises one or more special information and sales terminals 2 linked to an airline computerized reservation system 1 which gives access to the data processing installations of various travel suppliers 4. The terminals are all linked to the computerized reservation system by any suitable remote telecommunication links. This automated travel and tour sales system is preferably achieved according to the teaching of U.S. Pat. No. Re. 32,115 and U.S. Pat. No. 4,567,359 whose specifications are hereby incorporated herein by this reference.

The information and sales terminals 2 include one or more audio-visual data sources 9. These resident data sources are preferably optical disc based with the capabilities for generation of full motion, still-frame, audio compression and related functions to achieve random access audio-visual presentations directed by a microprocessor 14. Data sources 9 may suitably be implemented with a SONY View System brand of videodisc recorder model VIW-5000 and SONY 650 MB cartridge. Various combinations of interactive audio-visual system technology such as CD-ROM, CD-I or DVI may be incorporated to effectuate the travel presentations. The microprocessor 14 is suitably an IBM PS/2 brand of personal computer. The optical memory card reader 12 is of the type disclosed in U.S. Pat. Nos. 4,284,716; 4,542,288; and 4,544,835. The printer 7, CRT 8 and keyboard 13 are standard devices and the interfacing of the various components are well-known to those skilled in the data processing arts.

Figure 2:
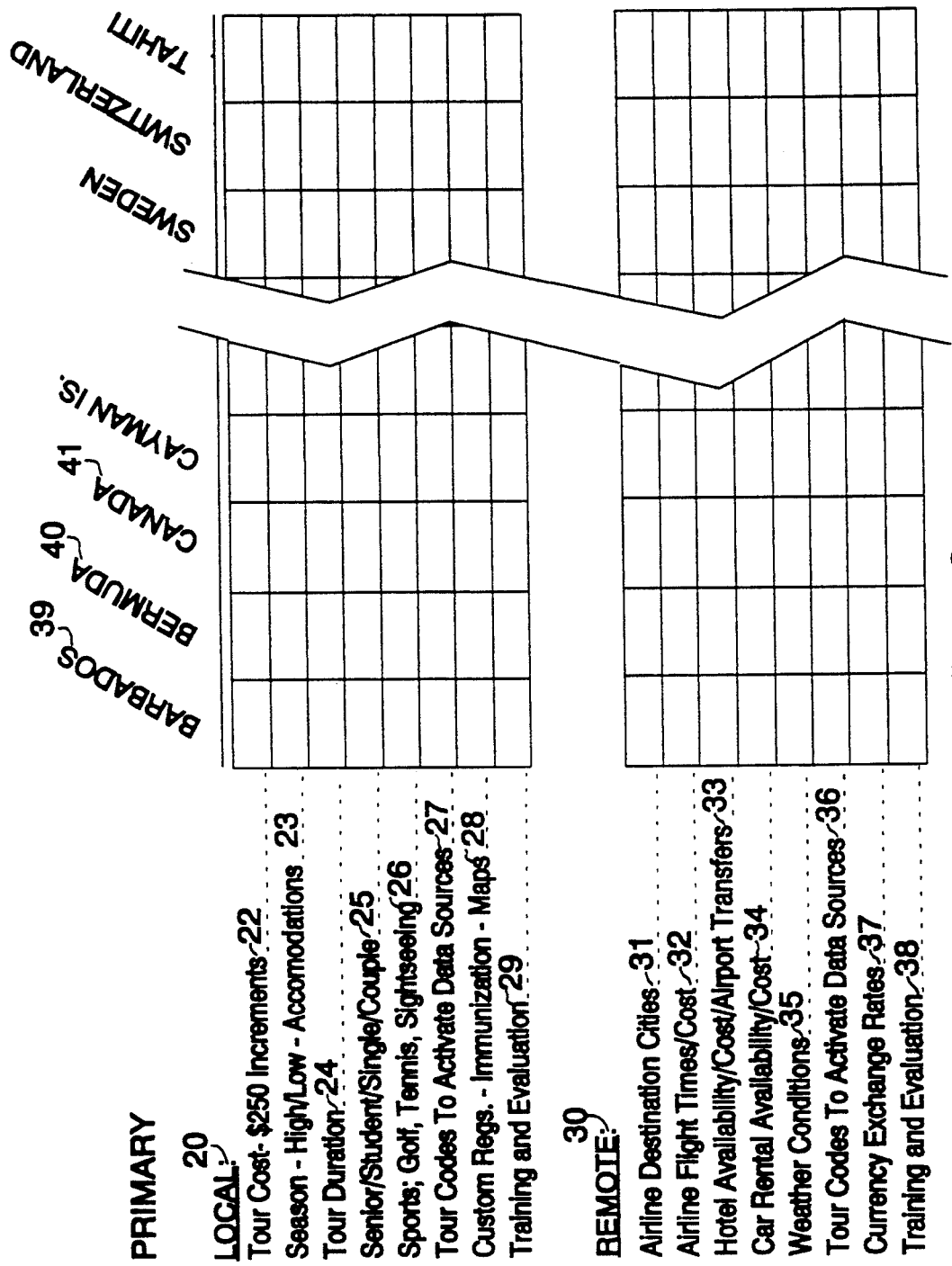
FIGS. 2 and 3 represent organizational charts of travel sales presentations from multiple data sources.

Organizational chart FIG. 2 describes audio-visual chapter segments which constitute the tour information and which are identifiable and accessible by frame numbers. A standard to videodisc contains 54,000 individual frames or 30 minutes of full motion video which can be accessed randomly. The construction of individualized tour package presentations by frame numbers is managed by the program of the microprocessor 14 as will be explained below. The travel agent enters the client's requests and characteristics to initiate the travel presentations. Each numbered chapter segment contains a transition bridge, so that presentations are not abrupt but rather form a continuous, harmonious dialogue with the client composed in a progressive predetermined format to increase sales effectiveness, for example; country, region, city, hotel and sightseeing. Training and evaluation 29 would typically consist of instructional information which would be presented in the form of lessons.

REMOTE 30 represents information which is accessed from the computerized reservation system 1. This information; airline flight times 32 and hotel availability 33 is critical to the tour sales presentation if transportation or lodging is required. Therefore, LOCAL 20 and REMOTE 30 act in conjunction to present an integrated and individualized travel and tour sales travelogue. REMOTE 30 creates dynamic presentations of transitory information such as weather conditions 35 or currency exchange rates 37.

REMOTE 30 can transmit tour codes to activate data sources 36 to information and sales terminal 2. This allows the organization of timely vacation tours in the travel agency. In this manner 'special' tours with limited reservation deadlines can be promoted that otherwise could not be marketed in traditional printed brochures.

It will be understood that optimal sales presentation effectiveness is determined by the attention span of the client. Therefore, program design parameters of the mini-travelogues include specific time limitations dependent upon client characteristics. Training and evaluation 38 offers an enhanced instructional program which can also transmit codes to the microprocessor-accessed data sources 9 in concert with transitory information from the computerized reservation system 1 to train and test travel agent proficiency presented on CRT 8.

Figure 3:
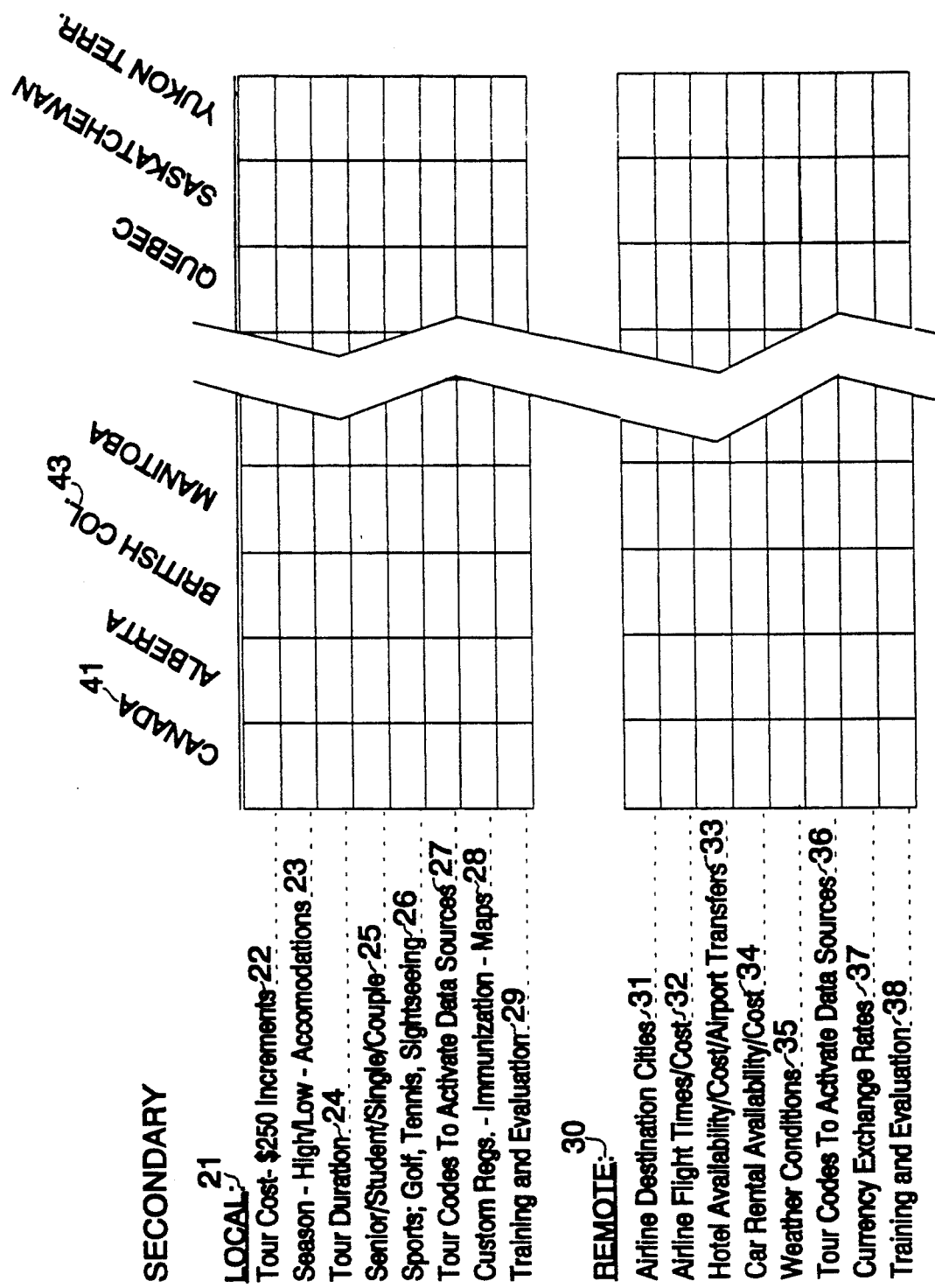

Organizational chart FIG. 3 describes a secondary selection format which further delineates tourist destinations in multiple subsets. If the client selected Canada 41, the microprocessor would define a Canadian province such as British Columbia 43 as a function of the client's characteristics. Additional organization format can define cities within the selected province and then tourist features within cities.

Figure 4:
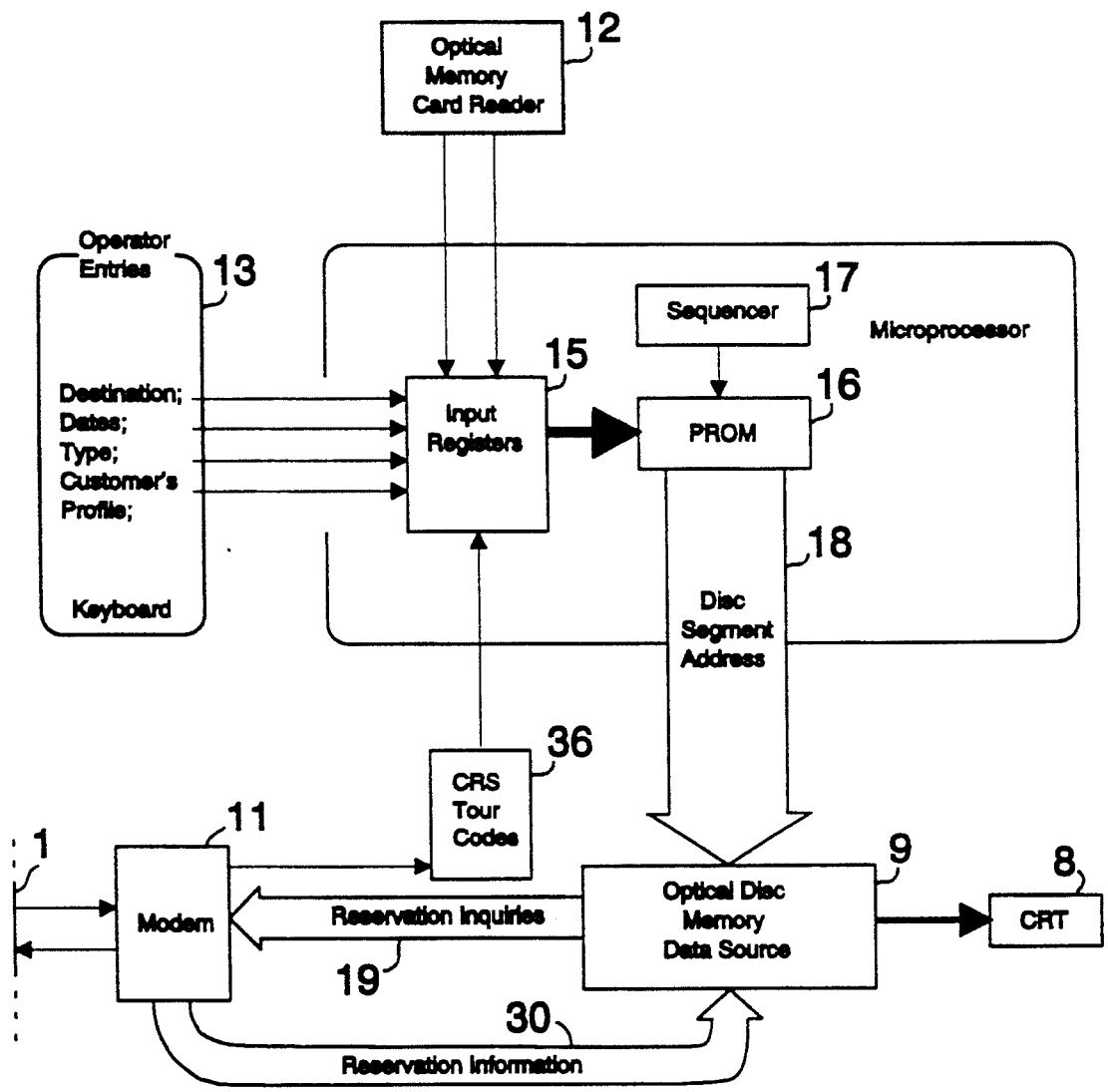
FIG. 4 is a block diagram of the sales presentation organization and display operation.

FIG. 4 illustrates the selection process for the various segments of the sales presentation. The basic selection data which is either entered on the keyboard 13 by the operator or read by the memory card reader 12 are loaded into the input registers 15 of the microprocessor 14. This basic selection data includes the type of service requested (such as ski weekend, cruise, or camping trip), the approximate date of departure and return, the destination and customer characteristics such as age, gender and preferences. This information serves as addresses for a programmable read only memory (PROM) 16 or other similar device which is driven by a sequencer 17 to deliver a series of specific disc segment addresses 18 for the videodisc memory data source 9. Some of the addressed segments on the videodisc correspond to inquiries 19 which are sent via a modem 11 to the airline reservation system 1. The answers, mostly reservation information 30, when received, are presented on a split-screen or recorded on the erasable optical disc or other suitable medium for display as part of the sales presentation on the CRT 8.

Three types of randomly accessible segments of data are thus stored in the data source 9, the audio-visually displayable narrative chapters, the inquiries to be sent to the reservation system and the reservation system answer to be combined with the narrative chapters.

Thus the programming of the entire sales presentation resides in the programming of the PROM 16. In other words, the PROM performs automatically and almost instantly, the sequential and time-consuming information gathering and organization that a travel agent must process using conventional reservation and information sources.

Figure 5:
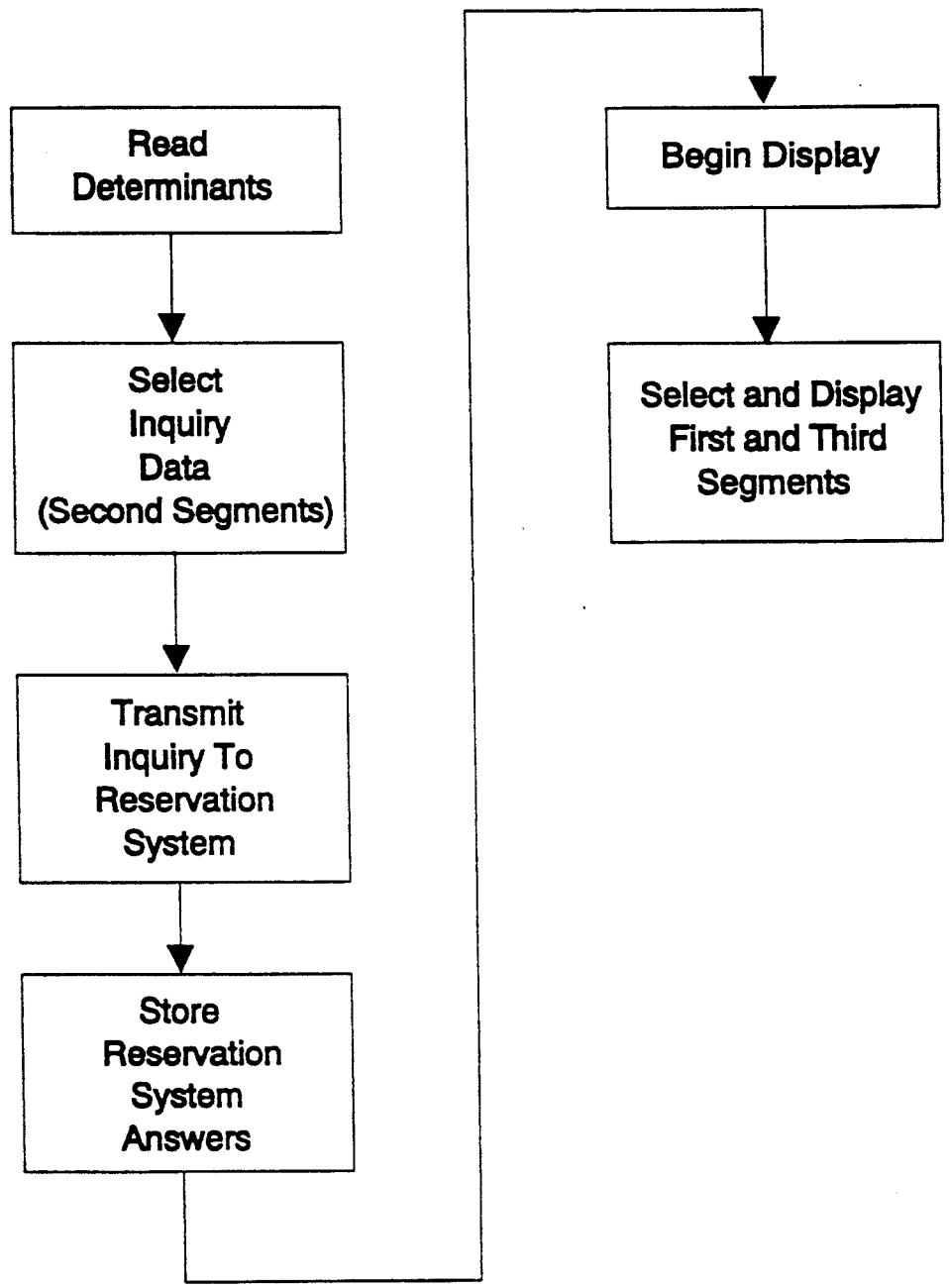
FIG. 5 is a flow diagram of the information selection and display process.

FIG. 5 illustrates the general selection and display process done under instructions issuing from the PROM 16 based on the determinants stored in the input registers 15 under control of the sequencer 17. It should be noted that the first segment of narrative data are the only ones that need to be coded for video display. The second segments are binary coded inquiries to be sent via the modem 11 to the reservation system 1. - The answers received from the reservation system are times and prices information which are displayed in alphanumeric form usually in a tabular format which does not require to be translated into variable-gray-scale-video signals, nor any graphic display encoding.

The determinants stored in the register 15 provide an address to the PROM 16 corresponding to a set of instructions. Those instructions are sequentially extracted by the sequencer 17 to trigger the various selection and display steps.

Data sources 9 typically include a videodisc which contains time codes indicating each video frame by hour, minutes, seconds and frame number or picture, chapter or still cue code inserted in the vertical interval of the videodisc which is read by the videodisc player. A frame is a single, complete picture in a video or film recording. A video frame consists of two interlaced fields of either 525 lines running at 30 frames per second (NTSC) or 625 lines at 25 fps (PAL/SECAM). The address is usually an alphanumeric or numeric label identifying a location where information is stored on the videodisc or a time code or frame number identifying the location of video and/or audio material on the optical disc.

A chapter is an independent, self-contained segment of an interactive video program. Chapter number codes are numbers also encoded in the vertical interval of the videodisc frame, allowing chapter numbers to be displayed on the screen during play. Chapter search is a function of most videodisc players allowing specific chapters to be accessed by chapter number or to request a specific frame identified by its unique sequential reference number, which then instructs the videodisc player to move directly forward or backward to that frame from any other point on the videodisc. Chapter step is a code embedded in videodiscs to signal the break between two separate chapters, allowing specific chapters to be accessed using chapter search. A standard videodisc contains 54,000 individual frames so chapter codes would encompass 1 to 54,000.

Figure 6:
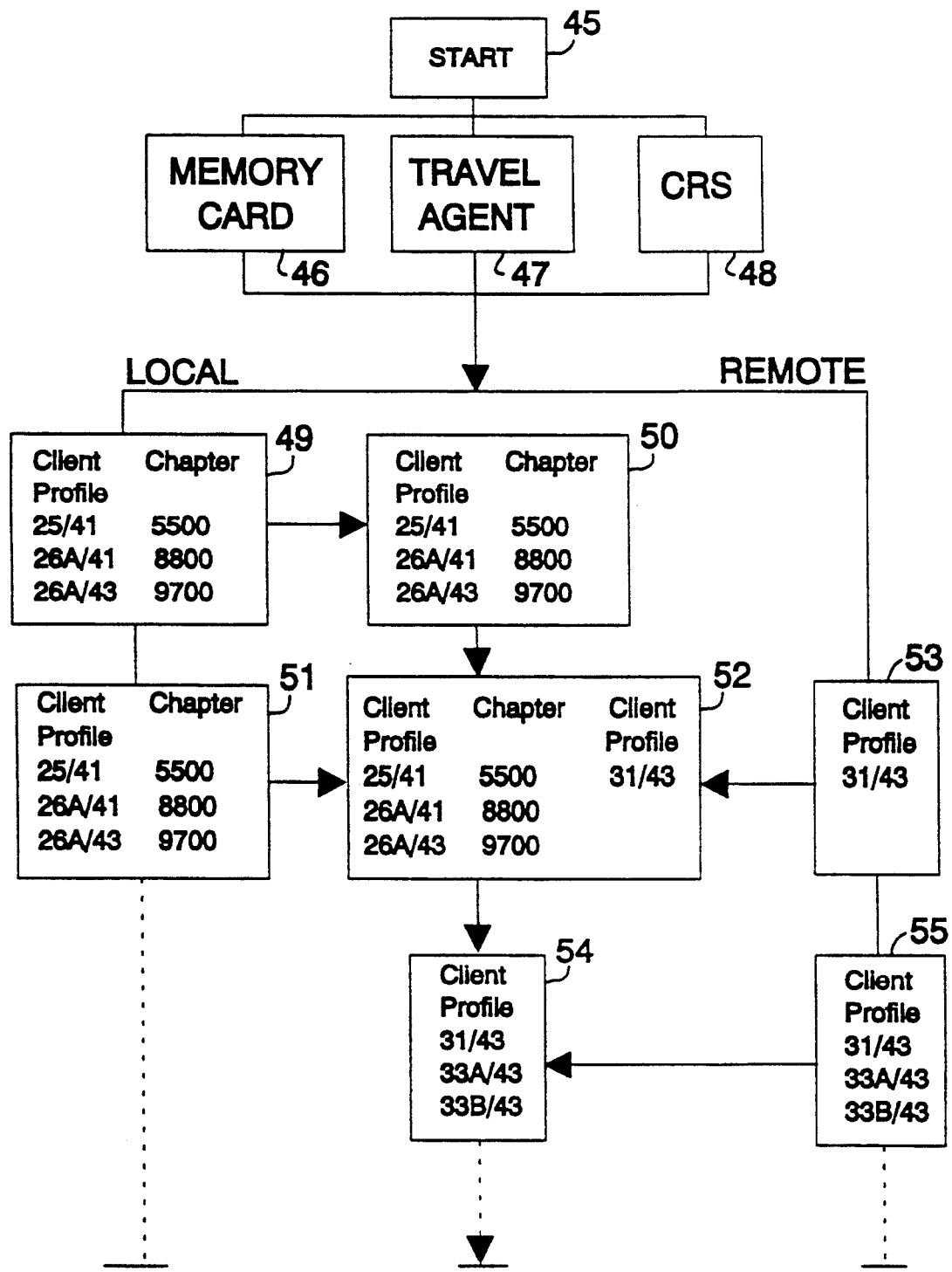
FIG. 6 is a flow diagram of a detailed information selection process.

Proceeding now to FIG. 6 which is a detailed flow diagram of the implementation of the address matrix to compose three sales presentation displays; LOCAL, LOCAL/REMOTE and REMOTE. The program selection is initiated 45 with activation of client's prerequisites from memory card 46, travel agent assessment 47 or by receipt of tour codes from computerized reservation system in response to client's profile 48. The selection determinants as described in organizational hierarchies FIGS. 2 and 3 depict specific chapter segments which when assembled would constitute an individualized sales presentation.

In FIG. 2 if client selects Senior 25 the chapter identity subset numbers would be; Senior/Barbados 25/39 chapter 5100, Senior/Bermuda 25/40 chapter 5300, Senior/Canada 25/41 chapter 5500 and so forth. If client selects Sports 26 the chapter identity subset number of one sport Golf 26-A which would include Golf/Barbados 26A/39 chapter 8200, Golf/Bermuda 26A/40 chapter 8500, Golf/Canada 26A/41 chapter 8800 and so forth.

Secondary organization Hierarchy FIG. 3 continues the composition process with Canadian province subsets. Golf/British Columbia 26A/43, for instance, would be chapter 9700. Therefore, Senior/Canada 25/41 chapter 5500 combined with Golf/Canada 26A/41 chapter 8800 and Golf/British Columbia 26A/43 chapter 9700 would compose an individual sales presentation 49 as represented in FIG. 6 with chapter selections displayed 50.

Integration of LOCAL 21 and REMOTE 30 to compose a sales presentation 52 is a combination of 51 as previously created in 49 and the transitory information 53 from the computerized reservation system 1. Organizational Hierarchy, FIG. 2 includes a matrix for necessary information from the remote data sources. For example, Airline Destination Cities 31 could display Canadian cities providing airline service 31/41. Assuming the senior/Canada/Golf/British Columbia client's presentation integrates Airline Destination Cities/British Columbia 31/43 as shown in FIG. 3 would be displayed. Additional scheduling information 55 such as; Hotel Availability 33A/43 and Airport Transfers 33B/43 would be displayed 54 to complete the sales presentation. It will be understood that multiple data sources can be incorporated in the sales presentation display and calculation of the individual tour expenses can be performed by the microprocessor 14. If the client desires a hard copy of this information it would be available from printer 7, creating an individualized travel brochure for the client.

This tour creating flexibility allows the computerized reservation system 1 to market 'special' or discounted tours with short-term availability. Historically, tour operators have been restricted in their ability to promote and market 'special' or discounted tours. The invention solves this dilemma by enhancing computerized reservation system capabilities while presenting timely travel and tour presentations in an individualized sales system.

The travel presentation would continue and if the client desired to reserve or purchase the tour package, the travel agent would process in a traditional manner. Additionally, complex, time-consuming Foreign Individual Tour planning is simplified and made more accurate.

The teaching of this invention allows both the client and travel agent to access travel and tour sales presentations in a highly organized manner. All the necessary functions to create and display individualized sales presentations are performed automatically. This results in significant savings of time for the client and travel agent and will potentially generate additional sales for the travel industry.

It is expected that the automated sales system will be a more convenient means to promote, compose and sell tour packages. Clients should benefit from a more comprehensive presentation of the intangible product of travel. The interactive video and computerized reservation system program design is developed with authoring programs which are well known to those skilled in the electronic arts.

It will be understood that this automated sales system may be applied to many other types of customer service and sales industries. Some examples are the retail sales and real estate industry and various financial services.

It will be clear that modifications can be made to the disclosed embodiment without departing from the spirit of the invention. The scope of the invention is therefore not limited to the disclosed embodiment but is defined by the appended claims.

What is claimed is:

1. A system for automatically dispensing information, goods or services for a plurality of institutions in a particular industry, comprising:
   a central data processing center including means for storing service, price rate information or sales information for each institution;
   at least one merchandising apparatus including means for dispensing information and services and means for remotely linking said apparatus to said central data processing center and for transmitting data back and forth between said central data processing center and apparatus; and
   a data processing terminal associated with each institution and means for remotely linking each terminal to said central data processing center comprising means for transmitting information back and forth between said data processing terminal and said central data processing center, each data processing terminal including means for storing institution service, price rate information or sales information, and input means for input of updated service or price rate information;
   said merchandising apparatus including:
   a means for composing and displaying individualized sales presentations according to determinants entered into said apparatus and based on a customer's profile and requests and in combination with at least one remotely-accessible source of information about available goods or services, which comprises:
   storage means holding a plurality of randomly accessible segments of data;

means for addressing said storage means as a function of said determinants, said means for addressing comprising:

means for selectively combining said determinants to address and retrieve at least one of said segments;

program-driven communication means for sending inquiries to, and for receiving up-to-date information from said remotely-accessible source;

video means for displaying some of said segments;

means for processing a sales order including means for holding information about, and order from said customer; and programmable means for directing the operation of said means for composing and displaying, means for addressing, means for selectively combining, communication means, video means, and means for processing, including means for holding an operational sequencing list and means responsive to statuses of said various means for controlling said operation;

said central data processing center including:

means responsive to data received from said merchandising apparatus for transmitting selected stored information to said apparatus via said linking means;

means responsive to a sales order from said merchandising apparatus for updating said sales information in said storage means, and transmitting said order to said apparatus via said linking means for dispensing of the ordered services;

means for periodically accessing said institution terminals via said linking means for transmitting sales information for each institution to its associated terminals, and means for periodically accessing said institution linking means for collecting and storing service or price rate information from each institution terminal.

2. The merchandising apparatus of claim 1, wherein said storage means comprise:

means for holding a plurality of first segments of data coded for video display;

means for holding a plurality of second segments of inquiry data coded for transmission to said remotely-accessible source; and means for holding a plurality of third segments comprising said up-to-date information about said goods or services.

3. The merchandising apparatus of claim 2, wherein said means for selectively combining comprise:

first storing means for holding said determinants;

second storing means addressed by said determinants for holding a sequence of instructions; and sequencing means acting upon said second storing means to sequentially extract said instructions.

4. The merchandising apparatus of claim 3, wherein said instructions comprise:

instructions to display some of said first segments;

instructions to send some of said second segments to said source;

instructions to store said third segments; and instructions to display said third segments.

5. The merchandising apparatus of claim 4, which further comprises:

means for entering said determinants;

wherein said remotely-accessible source is a travel and accommodation reservation service; and wherein said means for processing comprises means for communicating with said service.

* * * * *

UNITED STATES PATENT OFFICE
CERTIFICATE OF CORRECTION

PATENT NO. : 5,309,355
DATED : May 3, 1994
INVENTOR(S) : LAWRENCE B. LOCKWOOD

Page 1 of 2

It is certified that error appears in the above-identified patent and that said Letters Patent is hereby corrected as shown below:

On the title page:

--[x] Notice: The portion of the term of this patent subsequent to Nov. 16, 1999 has been disclaimed.--

Above: "[21] Appl. No.: 116,654"

- In the last line, replace "52-272800" with --52-72800--.

- In column 1, line 35, replace: "official" with --Official--.

- In column 3, in lines 19-20, delete:

in line 20 add: --SUMMARY OF THE INVENTION--.

in line 29, replace "multi@media" with --multi-media--.

UNITED STATES PATENT AND TRADEMARK OFFICE
CERTIFICATE OF CORRECTION

PATENT NO. : 5,309,355
DATED : May 3, 1994
INVENTOR(S) : Lawrence B. Lockwood

It is certified that error appears in the above-indentified patent and that said Letters Patent is hereby corrected as shown below:

In column 5, line 16, delete "to" after "standard".

In column 7, line 6, replace "step" with --stop--.

Signed and Sealed this

Tenth Day of January, 1995

*Attest:*

*Attesting Officer*

BRUCE LEHMAN

*Commissioner of Patents and Trademarks*